(12) United States Patent
Hess

(10) Patent No.: US 8,268,051 B2
(45) Date of Patent: Sep. 18, 2012

(54) PORTABLE OIL-WATER SEPARATOR APPARATUS

(76) Inventor: Daniel L. Hess, Hays, KS (US)

( * ) Notice: Subject to any disclaimer, the term of this patent is extended or adjusted under 35 U.S.C. 154(b) by 251 days.

(21) Appl. No.: 12/807,280

(22) Filed: Sep. 1, 2010

(65) Prior Publication Data

US 2012/0048118 A1     Mar. 1, 2012

(51) Int. Cl.
    *B01D 19/00*     (2006.01)
(52) U.S. Cl. ............... 95/253; 96/183; 96/182; 55/356; 210/237; 210/241
(58) Field of Classification Search ............ 96/183, 96/182; 95/253; 55/356; 210/237, 241
See application file for complete search history.

(56) References Cited

U.S. PATENT DOCUMENTS

| | | | |
|---|---|---|---|
| 2,354,856 A | 8/1944 | Erwin | |
| 2,619,187 A | 11/1952 | Hayes et al. | |
| 2,620,043 A | 12/1952 | Williams | |
| 2,933,447 A | 4/1960 | Walker et al. | |
| 3,213,594 A * | 10/1965 | Long | 96/165 |
| 3,312,044 A | 4/1967 | McCarter | |
| 3,469,373 A | 9/1969 | Lavery et al. | |
| 4,061,573 A | 12/1977 | Biron | |
| 5,928,519 A * | 7/1999 | Homan | 210/741 |
| 5,997,284 A * | 12/1999 | Gustafson et al. | 431/202 |
| 6,193,786 B1 * | 2/2001 | Henderson | 95/171 |
| 6,863,809 B2 * | 3/2005 | Smith et al. | 210/202 |
| 7,507,280 B2 * | 3/2009 | Tomshak et al. | 96/204 |

\* cited by examiner

*Primary Examiner* — Duane Smith
*Assistant Examiner* — Douglas Theisen
(74) *Attorney, Agent, or Firm* — John C. McMahon

(57) ABSTRACT

A preassembled and portable crude oil processing apparatus includes a support platform with a gas separator vessel covered by a shed structure and an elongated liquid separator vessel pivotally connected to the support platform. The liquid separator vessel includes support structure which supports it an a horizontal transport configuration. The apparatus is loaded onto a flatbed trailer and transported to a crude oil processing site with the liquid vessel in the horizontal configuration. At the processing site, the apparatus is hoisted off the trailer and deposited on the ground, and the liquid separator vessel is pivoted to a vertical configuration supported by the platform and secured in place. Plumbing associated with the gas separator vessel is then interconnected with plumbing associated with the liquid separator, with piping carrying a crude oil emulsion for processing, and with tanks for storing products of the process.

20 Claims, 3 Drawing Sheets

PORTABLE OIL-WATER SEPARATOR APPARATUS

BACKGROUND OF THE INVENTION

The present invention is broadly concerned with apparatus for separating water and gas from crude oil at an oil field site and, more particularly, to a prefabricated turnkey apparatus for such separation activities.

Crude oil is produced from oil wells drilled into the ground until they penetrate oil bearing layers beneath the surface. Although some oil deposits are under pressure and "gush" to the surface, a more typical situation is that the oil must be pumped to the surface for recovery. A common type of mechanism used to pump oil to the surface is referred to as a pump jack. A pump jack includes a walking beam pivotally supported on a frame and having a rear end connected to a crank arm with a counterweight. A front end of the walking beam has a "horse's head" shaped bearing structure which is connected by a cable, known as a bridle, to a polished sucker rod, or a string of such rods, extending through a seal or stuffing box down the well casing to a down hole pump mechanism. The down hole pump includes a set of check valves, commonly referred to as a lower standing valve and an upper traveling valve. Rotation of the crank arm by a motor geared thereto produces a vertically reciprocating motion in the sucker rod which repeatedly lowers and raises the down hole pump through the oil bearing zone. The action of the check valves causes the down hole pump to gather a quantity of oil on each pass and urge it above the down hole pump. Eventually the gathered oil is pushed to the top of the well casing by the pumping process and enters oil collection or well stream piping near the surface.

Crude oil produced from an oil well is typically an emulsion of a mix of petroleum liquids, water and/or aqueous solutions, and gases. The water component often includes various amounts of salt, while the gas is mostly methane. The petroleum and methane components have commercial and industrial value and are typically separated from the emulsion and stored for delivery to buyers of these products, although the methane gas is sometimes used as fuel for operating the oil pumping rig or other machinery associated with the oil well. The water or salt water is separated and may be pumped back into the ground locally or accumulated in an tank and transferred to other sites for pumping into the ground or other uses.

Often, the crude oil emulsion produced from a number of wells in a field is accumulated and processed in a separator plant which is constructed near the wells and whose separating capacity is related to the volume of crude oil production from the wells. Conventional separator plants are constructed in place near the oil well site, using conventional construction techniques. One aspect of many oil wells is their temporary nature. When the economically recoverable oil in a given deposit is depleted, the well or wells are capped, and the pumping machinery is removed, refurbished and reconstructed for service at another location, or scrapped. Once an oil well site is deactivated, the separator plant is no longer needed, and the components of the separator plant are also removed, refurbished and reconstructed, or demolished and scrapped.

SUMMARY OF THE INVENTION

The present invention provides an improved apparatus for separating the principal components of a crude oil emulsion in the form of a portable separator plant or apparatus which can be delivered to a crude oil production field, set-up, and operated and which can be loaded up and delivered to a new site when the current oil field is depleted of crude oil.

An embodiment of the portable separator apparatus includes a support platform having a main separator assembly pivotally connected thereto by a hinge mechanism. The support platform may have an auxiliary separator mechanism mounted thereon, including auxiliary separator plumbing. The main separator assembly includes an elongated main separator vessel in which components of a conventional 2-phase or 3-phase separator process are housed. The main separator vessel includes a main separator support base and external main separator plumbing. The main separator assembly includes vessel transport support structure to support the main separator vessel during transport of the apparatus to an oil field site at which the apparatus will be temporarily installed.

The apparatus is hoisted or otherwise loaded onto a flat bed trailer or an equivalent transport vehicle with the platform and main separator vessel both in substantially horizontal orientations. The trailer with apparatus is transported to an oil processing site, such as a site near an oil field having one or more crude oil producing pumps. At the processing site, the apparatus is hoisted off the trailer and deposited on the ground, which has been previously prepared, such as by leveling, compacting, and the like. The main separator vessel is then pivoted about the hinge, as by a boom apparatus, to stand it up vertically, supported by a portion of the support platform. Preferably, the main separator vessel is positively secured to the support platform. The main separator plumbing is connected to the gas separator plumbing. Crude oil emulsion plumbing from the oil producing pump or pumps is connected to the process plumbing to feed the emulsion thereto. Additionally, product plumbing is connected to the process plumbing to carry away oil, water, and gas products separated from the emulsion. The product plumbing can be connected to storage tanks or other processing equipment. Once all the plumbing connections have been made, the apparatus can be activated to process the oil emulsion.

When the recoverable oil deposits of the field have been depleted or if the wells will be temporarily capped for any reason or permanently capped, the apparatus can be prepared for removal from the current site and transported to another site for operation. The process and product plumbing is disconnected and capped, as are the auxiliary and main separator plumbing. The main separator vessel is released from the support platform and pivoted to a horizontal orientation, as by the use of a boom apparatus. The apparatus can then be hoisted onto a flat bed trailer for transportation to another site and erected for processing crude oil from wells at the new site.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
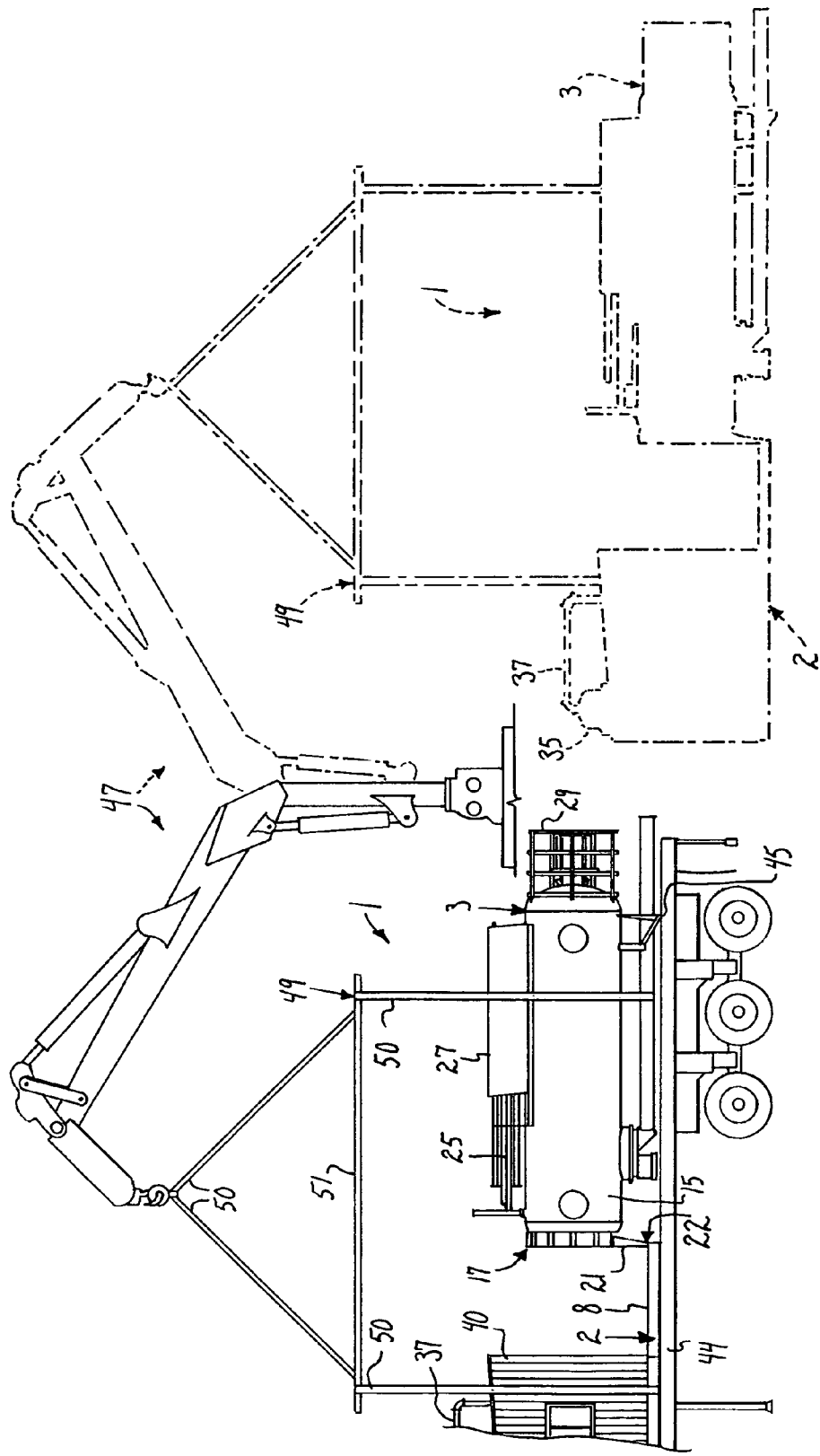
FIG. 1 is a fragmentary side elevational view of an embodiment of a portable oil-water separator apparatus according to the present invention shown in a truck loaded transport configuration, with an unloaded transport configuration of the apparatus shown in phantom lines.

Referring to the drawings in more detail, the reference numeral 1 generally designates an embodiment of a portable oil-water separator plant or apparatus according to the present invention. The apparatus 1 generally includes a platform assembly 2 and a main separator assembly 3 which is pivotally connected to the platform assembly 2. The main separator assembly 3 has a generally horizontal transport configuration (FIGS. 1 and 2) and a generally vertical processing configuration (FIGS. 2 and 3).

Figure 2:
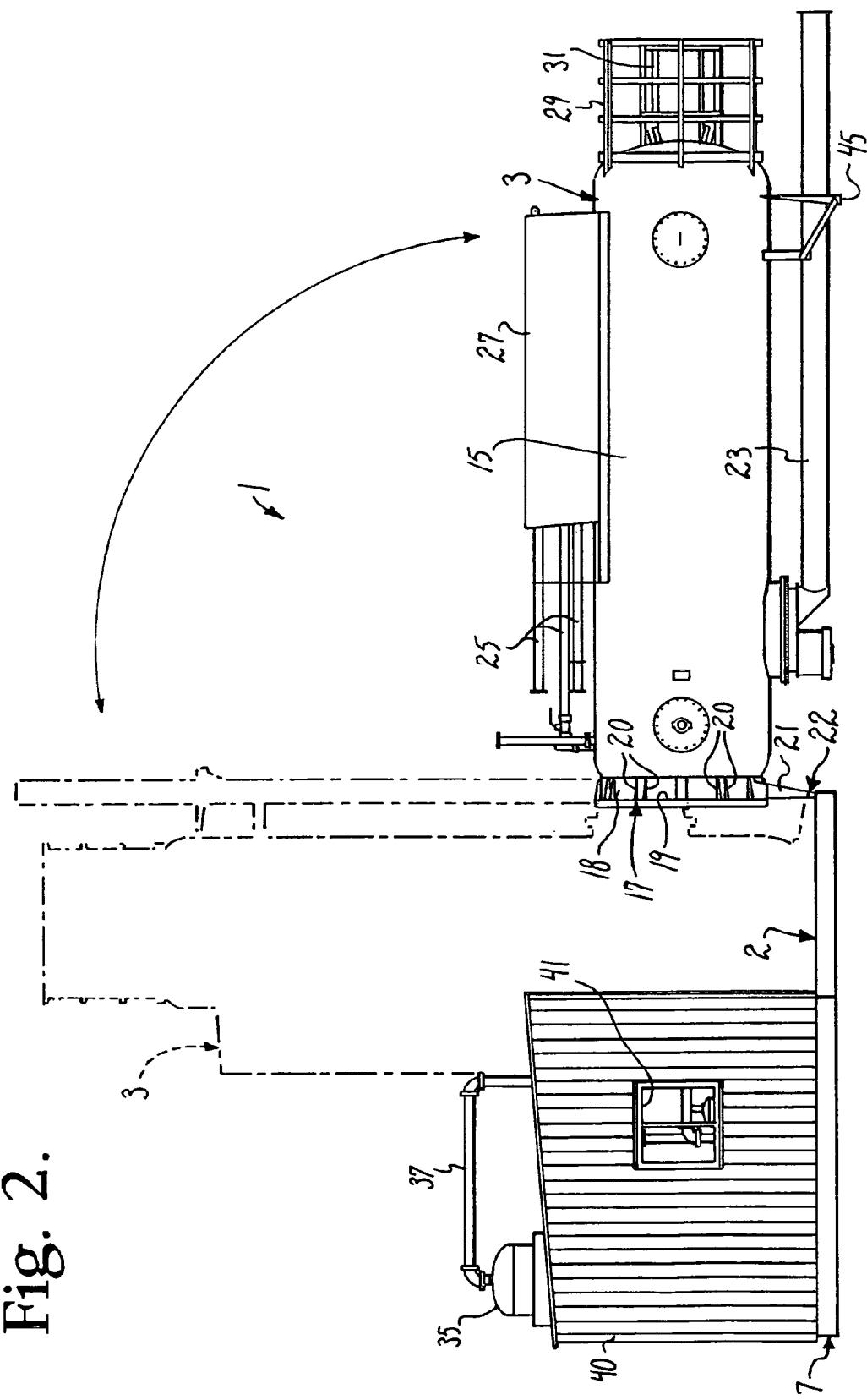
FIG. 2 is an enlarged side elevational view of the apparatus in the unloaded transport configuration and showing an upstanding installed configuration of a main separator vessel of the apparatus in phantom lines.
Figure 3:
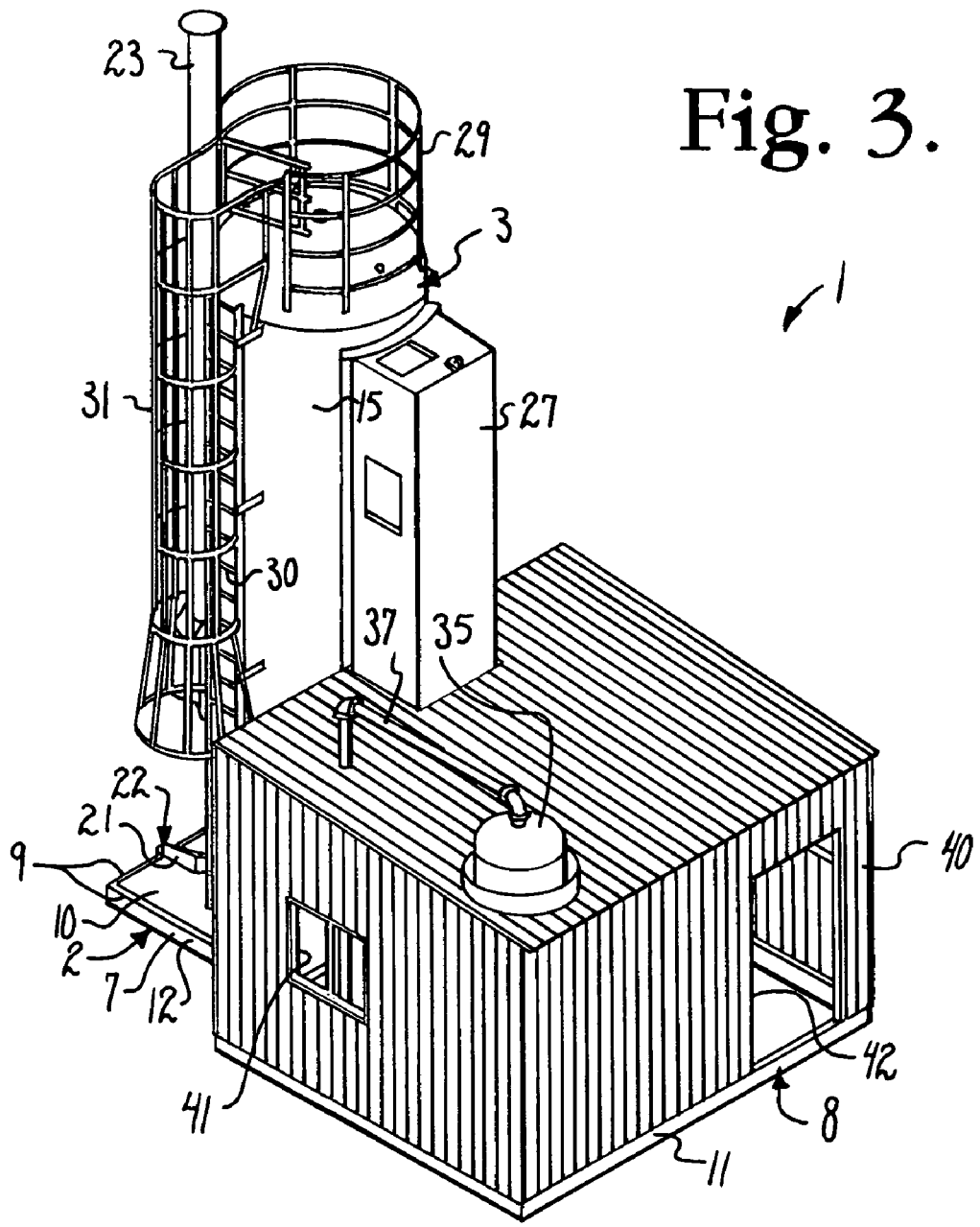
FIG. 3 is a perspective view of the apparatus with the main separator vessel positioned in the upstanding installed configuration.

Referring to FIGS. 2 and 3, the illustrated platform assembly 2 includes a lower platform frame 7 forming a support platform 8. The platform frame 7 may be formed as by a number of rectangular cross section tubular members 9 or other type of beam stock joined by welding, fasteners, and/or the like and may include a top plate 10 joined to the tubular members 9 to fill in some portions of the support platform 8. The platform 8 may have other portions filled in with concrete (not shown). The support platform 8 includes a shed platform section 11 and a main separator platform section 12, as will be described further below.

Referring to FIGS. 2 and 3, the illustrated main separator assembly 3 generally includes an elongated main separator vessel or liquid separator vessel 15 which is a liquid holding tank structure with additional structure and mechanisms therein for processing crude oil emulsions. The main separator vessel 15 includes a lower support base 17 which supports the vessel in an upstanding, vertical orientation. The illustrated support base 17 includes a cylindrical support ring 18 with a lower flange 19 extending radially therefrom. Sets of gussets 20 may be joined to the ring 18 and flange 19, as by welding, to stiffen the support ring 18. The flange 19 may also receive fasteners (not shown) to secure the base to the support platform 8 in the vertical orientation of the vessel 15, as will be described further below. The support base 17 is pivotally connected to one of the support frame members 9 by hinge arms 21 which form a hinge connection or hinge 22 between the platform assembly 2 and the main separator assembly 3.

The main separator vessel 15 may house a two-phase separator process, including provisions for separating oil and water based components from a crude oil emulsion which may be degassed in a separate vessel, or a three-phase process which also separates gas or some gas from the emulsion. The process is substantially conventional and involves gravity and mechanical separation of the oil, water, and gas components of the emulsion, aided by the application of heat. A heating unit (not shown) within the main separator vessel 15 provides the heat and may be fueled by the gas recovered from the emulsion or from another source, such as propane fuel which is delivered to the site. An exhaust stack 23 exits the vessel 15 and extends therealong to vent combustion products of the heating unit. The oil, water, and gas components of the separation process are output through individual separator plumbing pipes 25. The plumbing 25 may be enclosed in a separator plumbing housing 27 which is secured to the separator vessel 15. The vessel 15 may include frame members forming a "crow's nest" 29 for safe access to the top of the vessel 15. Additionally, a ladder 30 and ladder safety cage 31 (FIG. 3) may be provided along the vessel 15 for access to the crow's nest 29.

The illustrated apparatus 1 includes an auxiliary separator vessel in the form of a gas separator vessel 35 which is supported in a vertical orientation on the support platform 8. The gas separator vessel 35 has gas separator plumbing 37 connected thereto. In the apparatus 1, the vessel 35 encloses a gas separator process which receives the unprocessed crude oil emulsion and separates a major portion of gas from the emulsion by conventional techniques. The partially degassed emulsion is then piped to the main vessel 15 for separation of water and petroleum components and any remaining gas. In the illustrated apparatus 1, portions of the gas separator vessel 35, the gas separator plumbing 37, and the main separator plumbing 25 are enclosed within a shed structure 40 which is supported on the shed platform section 11 of the support platform 8. The main separator plumbing 25 is interconnected with the gas separator plumbing 37 within the shed 40. Additionally, supply plumbing (not shown) from oil producing pumps and product plumbing (not shown) which carry separated gas, water, and petroleum components of the emulsion are interconnected with the separator plumbing 25 and 37 within the shed 40. The shed 40 may include windows 41 for illumination and venting and a door 42 for access to equipment within the shed 40.

For transportation to a processing site, such as an oil field, the illustrated apparatus 1 is hoisted onto a flat bed trailer 44 with the main separator assembly 3, as well as the platform assembly 2, in a transport configuration in which each of the assemblies 2 and 3 are in a horizontal orientation. The main separator vessel 15 may include a support foot 45 or similar type of structure to support the vessel 15 in the horizontal orientation on the bed of the trailer 44. The hoisting is accomplished using a crane or boom mechanism 47. A hoisting rig 49 is used to connect the apparatus 1 with the boom 47 and may include a combination of strap members 50 and beam or frame members 51. Alternatively, arrangements of chains, cables, or other types of elements could be constructed to support the apparatus 1 during hoisting by the boom 47. It is also foreseen that the boom 47 could be mounted on the trailer 44 or on a separate vehicle.

When the trailer 44 with the apparatus 1 loaded thereon arrives at the processing site, the apparatus 1 is hoisted by a boom 47 from the trailer 44, still in the transport configuration, and deposited on the ground or other support surface. The ground is preferably prepared, as by leveling and compacting. It is foreseen that a support surface could be provided by a concrete pad which has been previously poured and cured. The hoisting rig 49 is separated from the apparatus 1. Then the boom 47 is used to stand the main separator assembly 3 up to a vertical orientation or installed configuration, pivoting the vessel 15 about the hinge connection 22, so that the support base 17 is supported by the separator platform section 12 of the support platform 8. Preferably, the main separator assembly 3 is secured in the upright position, as by bolts or other fasteners (not shown) passing through the base flange 19 into the separator platform section 12 or a top plate 10 supported thereon. The main separator plumbing 25 and the gas separator plumbing 37 are interconnected and connected with supply and product plumbing (hot shown). The apparatus 1 can then be activated to separate the components of the crude oil emulsion received from the producing wells.

When the oil field is to be deactivated, the plumbing 25 and 37 are be disconnected and capped after the vessels 15 and 35 have been emptied. The support base 17 is disconnected from the platform section 12, and the main separator assembly 3 is tilted from a vertical installed configuration to a horizontal transport configuration. The apparatus 1, thus configured, can be hoisted onto a flat bed trailer 44 and transported to another processing site, to a site for refurbishing and/or storage, or to a site for dismantling and scrapping or recycling of the components.

It is to be understood that while certain forms of the present invention have been described and illustrated herein, it is not to be limited to the specific forms or arrangement of parts described and shown.

What is claimed and desired to be secured by Letters Patent is:

1. A preassembled and portable crude oil processing apparatus for use at a temporary crude oil processing site to process a crude oil emulsion and comprising:
   (a) a horizontal support platform;
   (b) an elongated crude oil processing vessel connected by a hinge to said support platform, said vessel being configured for separating selected components from a crude oil emulsion;
   (c) said vessel being positioned in a first configuration in a substantially horizontal orientation to enable transportation of said platform and vessel to said processing site; and
   (d) said vessel being pivotal about said hinge to a second configuration in a vertical orientation supported by said platform at said processing site.

2. An apparatus as set forth in claim 1 wherein said processing vessel is a first processing vessel having first process plumbing and wherein:
   (a) said platform supports a second processing vessel and second process plumbing; and
   (b) said first process plumbing is connected to said second process plumbing in said second configuration.

3. An apparatus as set forth in claim 2 and including:
   (a) said platform supports a shed structure which encloses at least a portion of said second processing vessel and said second process piping.

4. An apparatus as set forth in claim 2 wherein:
   (a) said second processing vessel is configured as a gas separator to separate a gas from said crude oil emulsion.

5. An apparatus as set forth in claim 2 wherein:
   (a) said first processing vessel is configured as a liquid separator to separate water and oil components from said crude oil emulsion.

6. An apparatus as set forth in claim 2 wherein:
   (a) said first processing vessel is configured as a three phase separator to separate water, oil, and gas components from said oil emulsion.

7. An apparatus as set forth in claim 1 and including:
   (a) a support frame secured to said vessel to support said vessel in said first configuration on a flat bed trailer for said transportation of said platform and vessel to and from said processing site.

8. A preassembled and portable crude oil processing apparatus for use at a temporary crude oil processing site to process a crude oil emulsion and comprising:
   (a) a horizontal support platform;
   (b) a first processing vessel pivotally connected to said platform and including first processing vessel plumbing;
   (c) a second processing vessel mounted on said platform and including second processing vessel plumbing;
   (d) said first processing vessel being positioned in a first configuration in a substantially horizontal orientation to enable transportation of said apparatus to said processing site; and
   (e) said first processing vessel being pivoted to a second configuration in a vertical orientation supported by said platform at said processing site.

9. An apparatus as set forth in claim 8 wherein:
   (a) said first processing vessel plumbing is interconnected with said second processing vessel plumbing when said first processing vessel is positioned in said second configuration.

10. An apparatus as set forth in claim 8 and including:
    (a) a shed structure supported on said platform and enclosing portions of said second processing vessel and said second processing vessel plumbing.

11. An apparatus as set forth in claim 8 and including:
    (a) a support frame secured to said first processing vessel to support same in said first configuration on a flat bed trailer for said transportation of said apparatus to and from said processing site.

12. An apparatus as set forth in claim 8 wherein said first processing vessel includes:
    (a) a liquid separator vessel configured to separate oil and water components from said crude oil emulsion.

13. An apparatus as set forth in claim 8 wherein said first processing vessel includes:
    (a) a three phase separator vessel configured to separate oil, water, and gas components from said crude oil emulsion.

14. An apparatus as set forth in claim 8 wherein said second processing vessel includes:
    (a) a gas separator vessel configured to separate gas components from said crude oil emulsion.

15. A preassembled and portable crude oil processing apparatus for use at a temporary crude oil processing site for processing a crude oil emulsion and comprising:
    (a) a horizontal support platform;
    (b) a gas separator vessel mounted on said platform and including gas separator vessel plumbing, said gas separator vessel being adapted to separate a gas from said crude oil emulsion;
    (c) a liquid separator vessel pivotally connected to said platform and including liquid separator vessel plumbing, said liquid separator vessel being adapted to separate a water based component and an oil based component from said emulsion;
    (d) said liquid separator vessel being positioned in a first configuration in a substantially horizontal orientation to enable transportation of said apparatus to said processing site;
    (e) said liquid separator vessel being pivoted to a second configuration in a vertical orientation supported by said platform at said processing site; and
    (f) said gas separator vessel plumbing is interconnected with said liquid separator vessel plumbing when said liquid separator vessel is positioned in said second configuration.

16. An apparatus as set forth in claim 15 and including:
    (a) a shed structure supported on said platform and enclosing portions of said gas separator vessel and said gas separator vessel plumbing.

17. An apparatus as set forth in claim 15 and including:
(a) a support frame secured to said liquid separator vessel to support same in said first configuration on a flat bed trailer for said transportation of said apparatus to and from said processing site.

18. An apparatus as set forth in claim 15 wherein:
(b) said liquid separator vessel is additionally configured to separate said gas from said crude oil emulsion.

19. A method for processing a crude oil emulsion at a temporary crude oil processing site and comprising the steps of:
(a) providing a crude oil processing apparatus including a support platform and an elongated crude oil processing vessel pivotally connected to said support platform;
(b) positioning said apparatus on a flat bed trailer with said support platform and said vessel in substantially horizontal orientations;
(c) transporting said flat bed trailer with said apparatus thereon to said temporary crude oil processing site;
(d) hoisting said apparatus from said flat bed trailer and positioning said apparatus on ground at said processing site; and
(e) pivoting said processing vessel to a vertical orientation supported by said support platform.

20. A method as set forth in claim 19 and including the steps of:
(a) pivoting said processing vessel to a substantially horizontal orientation;
(b) hoisting said apparatus onto a flat bed trailer; and
(c) transporting said flat bed trailer with said apparatus thereon away from said processing site.

* * * * *